APPARATUS FOR PERFORMING ARITHMETIC OPERATIONS

Filed March 27, 1958

5 Sheets-Sheet 1

INVENTOR.
MYRON J. MENDELSON

Henry L. Shenier
ATTORNEY

APPARATUS FOR PERFORMING ARITHMETIC OPERATIONS

Filed March 27, 1958

5 Sheets-Sheet 2

INVENTOR.
MYRON J. MENDELSON

BY Harry L. Shenier

ATTORNEY

Jan. 30, 1962 M. J. MENDELSON 3,018,955

APPARATUS FOR PERFORMING ARITHMETIC OPERATIONS

Filed March 27, 1958 5 Sheets-Sheet 3

INVENTOR.
MYRON J. MENDELSON
BY Harry L. Shenier
ATTORNEY

APPARATUS FOR PERFORMING ARITHMETIC OPERATIONS

Filed March 27, 1958 5 Sheets-Sheet 4

INVENTOR.
MYRON J. MENDELSON
BY Henry L. Shenier
ATTORNEY

Jan. 30, 1962 M. J. MENDELSON 3,018,955

APPARATUS FOR PERFORMING ARITHMETIC OPERATIONS

Filed March 27, 1958 5 Sheets-Sheet 5

INVENTOR.
MYRON J. MENDELSON
BY Henry L. Shenier
ATTORNEY

United States Patent Office 3,018,955
Patented Jan. 30, 1962

3,018,955

APPARATUS FOR PERFORMING ARITHMETIC OPERATIONS

Myron J. Mendelson, Los Angeles, Calif., assignor, by mesne assignments, to United Aircraft Corporation, East Hartford, Conn., a corporation of Delaware Filed Mar. 27, 1958, Ser. No. 724,413
23 Claims. (Cl. 235—155)

My invention relates to apparatus for performing arithmetic operations, and more particularly to apparatus which is capable of performing such operations in which the operators and operands are expressed in numbers having different base number systems.

Many high-speed, automatic scientific data collection systems give results which are expressed in the binary number system. Since binary numbers are not readily intelligible to individuals using the equipment, the binary representation must be converted to a representation in the decimal number system, if an intermediate sampling or result is desired. Because of the nature of these collection systems, it is also commonly found that a direct conversion of their binary data to decimal form does not provide a directly usable representation of their results. In the operation of the data collection system, all inputs are normalized to a common level so that a single digitizing element may be used. In order to obtain the greatest accuracy, the normalizing operation is generally performed in such a way that the output of the system becomes a binary fraction indicating the percentage of a full scale range that a function has obtained at the time it is sampled. To convert such a fraction to a useful reading, it must be multiplied by the true value of the full scale range and then corrected to the true zero point of that range. Thus, three operations, a binary to decimal conversion, a multiplication, and an addition, must be performed on a piece of information before it may be usefully presented to human operators for inspection.

The usual practice in carrying out the necessary arithmetic operations in the prior art is to express the operands in a common number system before executing any arithmetic operations on them. For example, the operands may be converted to the decimal number system before the multiplication and addition operations are performed. Alternatively, the operands may be expressed in the binary number system, the required arithmetic operations performed, and the result converted to decimal form.

One example of the situation outlined above is the case in which a temperature measuring instrument is employed to measure temperatures in the range from −50° C. to 142° C. Let us assume, for example, that the actual temperature expressed in decimal form is the fraction $9/16$ of full-scale output which fraction, expressed in binary form, is the binary fraction .1001000000 correct to ten binary places. In order to determine the true temperature reading, since 192° C. is the full-scale range, $9/16$ must first be multiplied by 192 to give the temperature as 108° C., referred to the lower limit of −50° C. To obtain the temperature referred to 0° C. the magnitude of the lower limit, or −50° C. must be added to 108° C. to give the true temperature, 58° C., referred to 0° C. It will be appreciated that, given the binary fraction, in order to perform the above-described operations in the prior art conversion of this fraction either to the decimal system or of the numbers 192 and −50 to the binary system is required before the operations can be performed.

It is to be understood that by a binary coded decimal number I mean a number the individual digits of which are represented by groups of bits in accordance with a binary code. By a binary number I mean a number which is represented by a continuous series of bits in accordance with a binary code.

I have invented apparatus for performing arithmetic operations with operands expressed in different base number systems. For example, my apparatus is capable of multiplying a binary number by a binary coded decimal number to give the result directly as a binary coded decimal number. My system is capable of operating with either binary fractions or binary whole numbers. Elements of my system may be used to convert from a binary fraction to a binary coded decimal fraction and to perform the reverse conversion. Elements of my system may readily be arranged to convert a binary integer to a binary coded decimal integer and to perform the reverse operation. It will be appreciated that my system does away with the expensive auxiliary converting equipment required in performing arithmetic operations in data collection systems of the prior art which express results in binary form.

One object of my invention is to provide apparatus for performing arithmetic operations with operands expressed in different base number systems.

Another object of my invention is to provide apparatus for multiplying a binary fraction by a binary coded decimal number.

Another object of my invention is to provide apparatus for multiplying a binary integer by a binary coded decimal number.

A further object of my invention is to provide apparatus for converting a binary fraction to a binary coded decimal fraction and for converting a binary coded decimal fraction to a binary fraction.

A further object of my invention is to provide apparatus for converting a binary integer to a binary coded decimal integer and for converting a binary coded decimal integer to a binary integer.

A still further object of my invention is to provide apparatus for performing arithmetic operations without requiring the auxiliary conversion equipment necessary in systems of the prior art.

Other and further objects of my invention will appear from the following description.

In general my invention contemplates the provision of apparatus for multiplying a binary number or operand by a binary coded decimal number or operand. I provide a first register for receiving the binary operand, a second register for receiving the binary coded decimal operand and a binary coded decimal accumulator register. My apparatus operates through a successive series of identical cycles. On each cycle the binary coded decimal operand is halved and returned to its storage register. At the end of each cycle the binary fractional operand is doubled. On each cycle in which the bit directly to the right of binary point in the binary register is a one the content of the binary coded decimal register is added to the content of the binary coded decimal accumulator register. On each cycle in which the bit directly to the right of the binary point in the binary register is a zero the content of the binary coded decimal accumulator remains unchanged. When a number of cycles equal to the total number of bit positions in the binary register have been performed the accumulator register contains the desired binary coded decimal product.

If the binary operand is an integer, I halve it by shifting the integer through one place in a direction from the most significant bit toward the least significant bit. For each cycle of the operation, I double the accompanying binary coded decimal operand by means of my novel doubler. I intermittently feed the binary coded decimal number to the accumulator register whenever the accompanying binary number is odd. In this manner at the termination of the operation the accumulator will bear the desired product. In the doubler, I pass the respective digits of the binary coded decimal number sequentially through my doubler in order of digits from the least significant digit through the most significant digit. If the digit which has just been doubled was less than five the output digit of the doubler is exactly double the input digit if the latter number is less than ten, or is double the input digit less ten if this number is greater than ten. If the digit which has just been doubled was greater than or equal to five the output digit of the doubler is double the input digit plus one if this latter number is less than ten, or is double the input digit plus one, less ten if this number is greater than ten. The result of the operation of my doubler is a binary coded decimal number which is double the number fed through the doubler.

If the binary operand is a fraction, I double the number by shifting the fraction through one place in a direction from the least significant bit toward the most significant bit. In the course of this operation carry-overs into the units place are ignored. I begin with half the binary coded decimal operand, which is introduced into the operand register. On successive cycles of the operation I successively halve the already halved coded decimal operator. I intermittently feed the binary coded decimal number to the accumulator register whenever the accompanying binary fraction will go over to the units place on the next doubling operation. In this manner at the termination of the operation my accumulator will bear the desired product. In the halver, I pass the digits of the binary decimal number through my halver in order of digits from the least significant digit through the most significant digit. If the next-most significant digit to that digit being fed to the halver is odd, the halver assumes that the digit being fed to the halver is the units digit of a two-digit number having "1" as its tens digit and produces an output representing half the two-digit number, neglecting fractional remainders. If the next-most significant digit to that digit being fed to the halver is even, my halver produces an output representing half the input digit, neglecting fractional remainders.

By way of two simple examples to illustrate the above operations, assume that I first wish to multiply the binary operand "17" by the binary coded decimal operator "38." Second assume that I wish to multiply the binary operand "9/16" by the binary coded decimal operator "256." The following table illustrates the operations performed by my apparatus:

| Integral Operand | | | |
|---|---|---|---|
| Operand | | Operator | Accumulator |
| Decimal | Binary | Decimal | |
| 17 | 10001 | 38 | ————→38 |
| 8 | 01000 | 76 | |
| 4 | 00100 | 152 | |
| 2 | 00010 | 304 | |
| 1 | 00001 | 608 | ————→+608 |
| 17×38=646 | | | |
| Fractional Operand | | | |
| 0.5625 | .1001 | 128 | ————→128 |
| 1.1250 | .0010 | 64 | |
| 0.2500 | .0100 | 32 | |
| 0.5000 | .1000 | 16 | ————→+16 |
| 1.0000 | .0000 | 8 | |
| 9/16×256=144 | | | |

As will be explained in detail hereinafter, elements of my system may be arranged to provide conversion from a binary representation to a binary coded decimal representation and the inverse operations.

In the accompanying drawings which form part of the instant specification and which are to be read in conjunction therewith and in which like reference numerals are used to indicate like parts in the various views:

FIGURE 9 is a schematic view of elements of the system shown in FIGURE 4 arranged to provide conversion from a binary coded decimal integer to a binary integer.

Figures 1, 4:
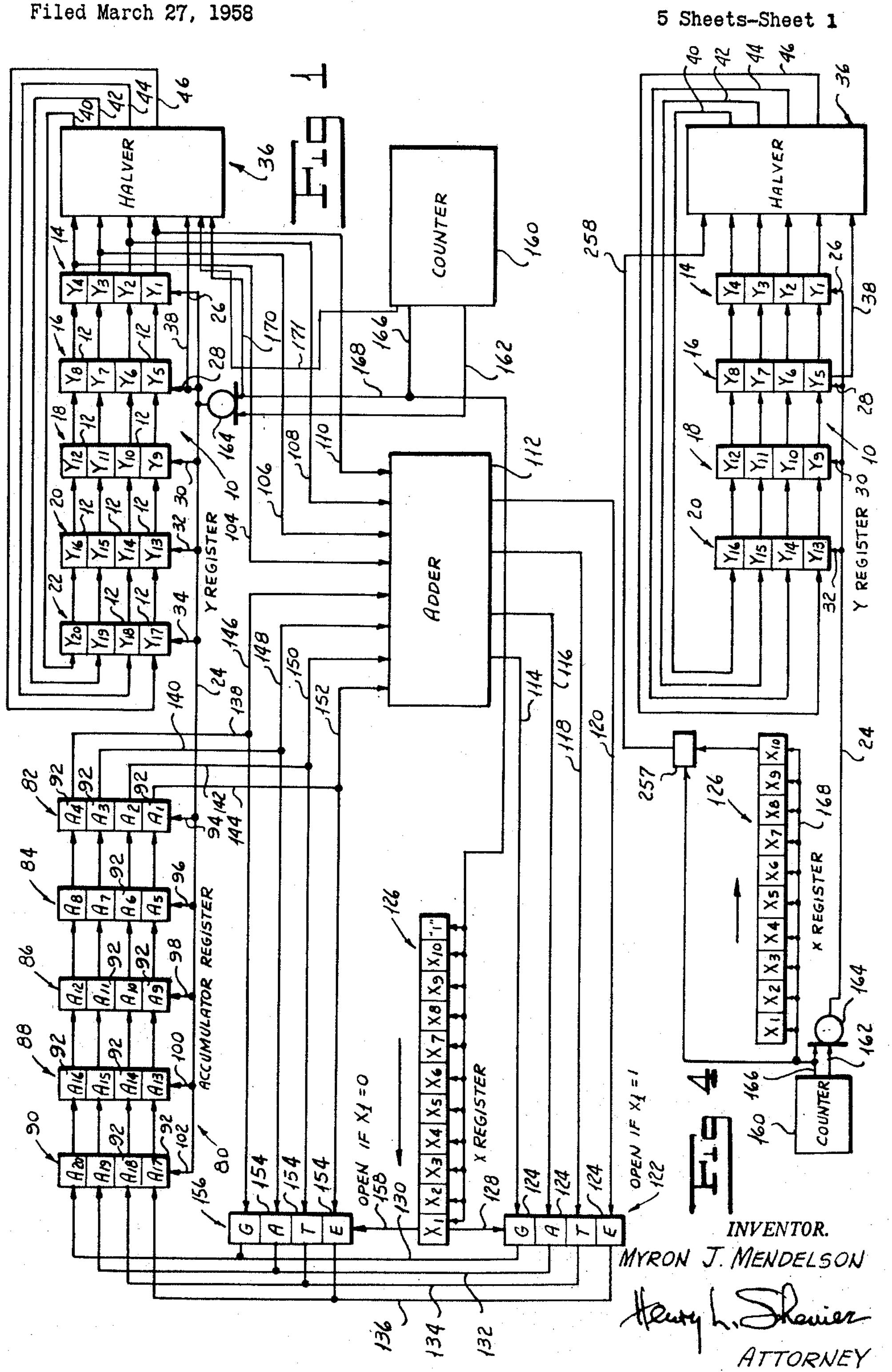
FIGURE 1 is a schematic view of a form of my apparatus which is adapted to multiply a binary fraction by a binary coded decimal number.
FIGURE 4 is a schematic view of elements of the system of FIGURE 1 arranged to provide conversion from a binary fraction to a binary coded decimal fraction.

As is known in the art a process for obtaining the binary fraction equivalent to a given decimal fraction is the following: The digit immediately to the right of the decimal point in the decimal fraction is examined. If it is greater than or equal to five, a one is placed in the first position to the right of the binary point in the binary equivalent being developed. If it is less than five a zero is placed in the first position to the right of the binary point in the binary equivalent being developed. The decimal fraction is then doubled. The digit now occupying the first position to the right of the decimal point is again examined. If this digit is greater than or equal to five, a one is placed in the second position to the right of the binary point in the binary equivalent being developed. If this digit is less than five, a zero is placed in this position. Successive doublings of the decimal fraction, together with similar examinations of the digit immediately to the right of the decimal point are used to determine succeeding digits in the binary equivalent. For example, the fraction 9/16=0.5625 may be converted to the natural binary system as shown below in Table I.

*Table I*

| Fraction Doubled | Binary Representation |
|---|---|
| 0.5625 | .1 |
| 1.1250 | .10 |
| 0.2500 | .100 |
| 0.5000 | .1001 |
| 1.0000 | .10010 |
| 0.0000 | .100100 |
| 0.0000 | .1001000 |
| 0.0000 | .10010000 |
| 0.0000 | .100100000 |
| 0.0000 | .1001000000 |

If we designate this binary fraction as X, it may be expressed as:

$$X=\frac{X_1}{2}+\frac{X_2}{2^2}+\dots+\frac{X_n}{2^n} \quad (1)$$

where $X_1=0.1$.

To determine the representation of a decimal integer in the natural binary system the number is examined to see if it is "odd" or "even." If it is odd a one is established in the binary representation; if it is even a zero is established. The decimal number is then halved, with any remainder being ignored. The "oddness" or "evenness" of the result of this halving operation determines whether the next bit of the binary equivalent is a one or a zero according to the same rule. Successive halvings of the decimal integer produces successive bits of the binary equivalent according to the same law. Taking, for example, the number 5625, it may be converted to the equivalent binary representation as shown in Table II below.

*Table II*

| Number Halved | Binary Representation |
|---|---|
| 5625 | 1. |
| 2812 | 01. |
| 1406 | 001. |
| 703 | 1001. |
| 351 | 11001. |
| 175 | 111001. |
| 87 | 1111001. |
| 43 | 11111001. |
| 21 | 111111001. |
| 10 | 0111111001. |
| 5 | 10111111001. |
| 2 | 010111111001. |
| 1 | 1010111111001. |

If we designate this decimal integral number as X, it may be represented as:

$$X = X_0 + 2X_1 + 2^2X_2 + \ldots + 2^nX_n \tag{2}$$

where $X_i = 0.1$.

In another system a number such as the number 5625 may be represented by four groups of bits 0101, 0110, 0010, 0101. This representation is known as a binary coded decimal representation of the number.

As has been explained hereinabove, one form of my apparatus is adapted to multiply a binary fraction times a binary coded decimal number having any arbitrary decimal point. If we represent the number Y as a binary coded decimal number, the product $P = XY$ can be written from Equation 1 as:

$$P = Y\left(\frac{X_1}{2} + \frac{X_2}{2^2} + \ldots + \frac{X_n}{2^n}\right) \tag{3}$$

$$P = X_1\frac{Y}{2} + X_2\frac{Y}{4} + X_3\frac{Y}{8} + \ldots X_n\frac{Y}{2^n} \tag{4}$$

It will be apparent from Equation 4 that the product P is the sum of all the numbers $$\frac{Y}{2^i}$$

for which $X_i$ is a "1" in the binary fraction X. I have provided apparatus for performing the operations indicated by Equation 4 to arrive at the product P.

Referring now more particularly to FIGURE 1 of the drawings, a form of my apparatus which is adapted to multiply a binary fraction such as X by a binary coded decimal such as Y includes a first input or "Y" shift register indicated generally by the reference character 10. This register 10 is made up of, for example, twenty flip-flop circuits 12 arranged in five respective banks indicated generally by the respective reference characters 14, 16, 18, 20 and 22, each of which groups includes four flip-flop circuits. As is known in the art, each of the circuits 12 is adapted to receive and store one bit of a representation of a digit of a decimal number. In response to a shift pulse, each flip flop passes its bit to the succeeding flip flop. Shifting registers of the nature of the register 10 are well known in the art. One type of shifting register which may be employed in my apparatus is shown and described on pages 144 to 148 of "Arithmetic Operations in Digital Computers" by R. K. Richards, published by D. Van Nostrand Co. Inc., New York (1955). For purposes of convenience, I have indicated the shift pulses for the register 10 as being carried by a channel 24 and as being fed to the respective groups of flip flops by respective input channels 26, 28, 30, 32 and 34 going to the respective banks 14, 16, 18, 20 and 22. When the conductor 24 carries a shift pulse, the bits carried by the flip flops 12 of each bank shift to the bank of flip flops to the right as viewed in FIGURE 1. For example, the bits in bank 22 shift to bank 20, the bits in bank 20 shift to bank 18, and so forth. This Y register 10 in the arithmetic operation being considered is adapted to receive the respective representations of the digits of the decimal number in a manner to be described hereinafter. As will be apparent from Equation 4 above, in order to perform the arithmetic operation, it is necessary to successively halve the binary coded decimal number Y.

I have devised a novel arrangement for successively halving any binary coded decimal number. It can be demonstrated that any decimal number can be halved by successively dividing its digits from the least significant digit to the most significant digit and writing the resultant digits in accordance with the following Table III.

*Table III*

| Digit | Binary Form | Next Digit Even | | Next Digit Odd | |
|---|---|---|---|---|---|
| | | Digit | Binary Form | Digit | Binary Form |
| 0 | 0000 | 0 | 0000 | 5 | 0101 |
| 1 | 0001 | 0 | 0000 | 5 | 0101 |
| 2 | 0010 | 1 | 0001 | 6 | 0110 |
| 3 | 0011 | 1 | 0001 | 6 | 0110 |
| 4 | 0100 | 2 | 0010 | 7 | 0111 |
| 5 | 0101 | 2 | 0010 | 7 | 0111 |
| 6 | 0110 | 3 | 0011 | 8 | 1000 |
| 7 | 0111 | 3 | 0011 | 8 | 1000 |
| 8 | 1000 | 4 | 0100 | 9 | 1001 |
| 9 | 1001 | 4 | 0100 | 9 | 1001 |

As has been explained hereinabove and as can be seen from Equation 4 in order to perform the arithmetic operation of multiplying a binary fraction times a binary coded decimal number, it is necessary successively to halve the binary coded decimal number until the operation is complete. I have provided a novel halver indicated generally by the reference character 36 in FIGURE 1. As will be apparent from Table III in order to perform the halving operation, halver 36 requires not only all the bits representing the digit to be halved but also the least significant bit of the next most significanat digit of the binary coded decimal number since this bit determines the "oddness" or "evenness" of that digit. I connect the outputs of the flip-flops of the bank 14 to the inputs of the halver and connect the output of the flip-flop containing the least significant bit of the representation in bank 16 to the halver by a conductor 38. Respective channels 40, 42, 44 and 46 feed the halver output to the input terminals of bank 22 of the register 10.

Figures 2, 7:
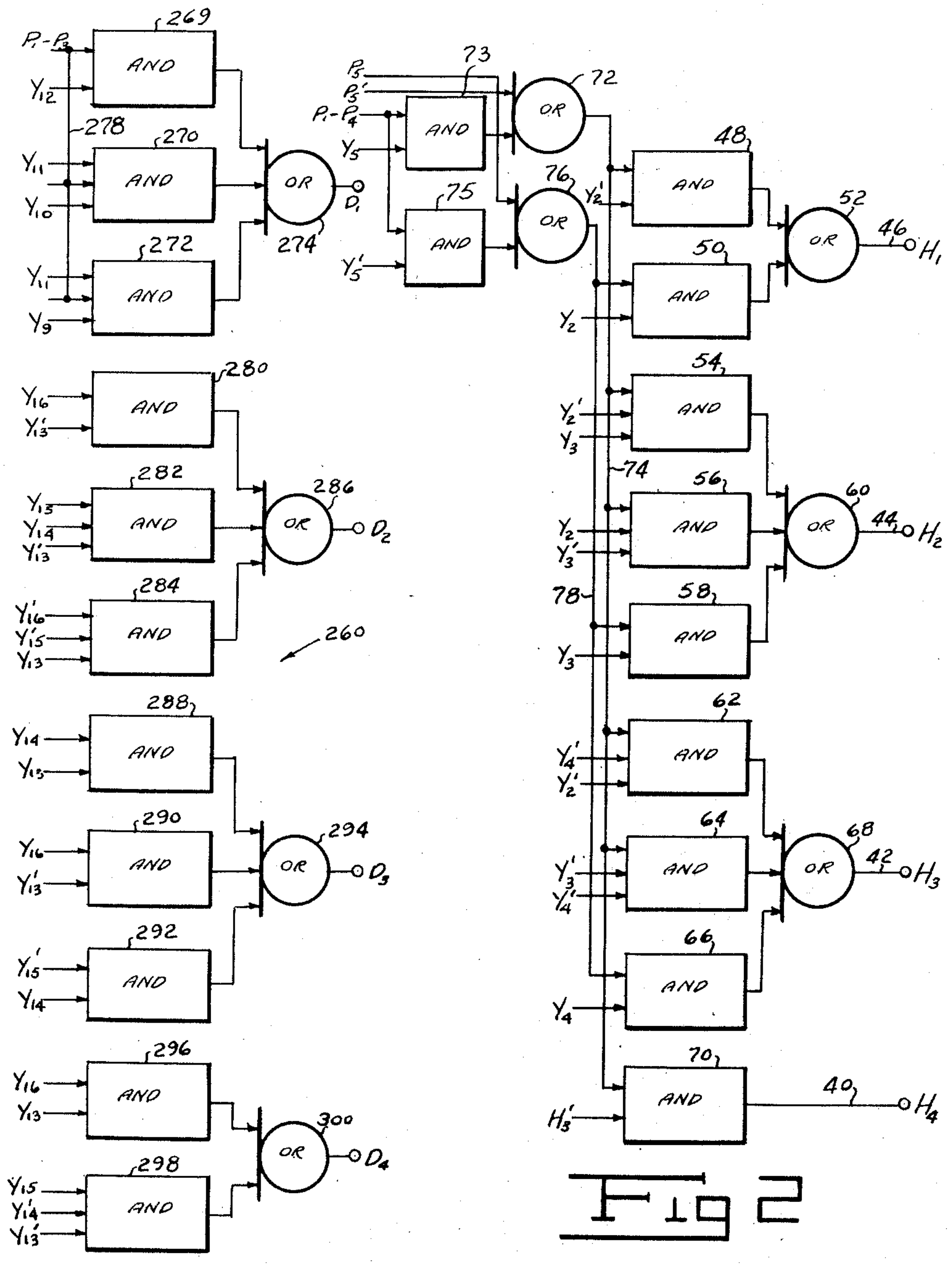
FIGURE 2 is a schematic view of the novel halver forming part of the system shown in FIGURE 1.
FIGURE 7 is a schematic view of another form of my doubler which operates most significant digit first.

Referring now to FIGURE 2, I have shown logic circuitry of my halver 36 for halving a binary coded decimal number in accordance with Table III. Respective two-input AND components 48 and 50 have their outputs connected to a two-input OR circuit 52. Respective three-input AND circuits 54 and 56 and a two-input AND component 58 have their outputs connected to a three-input OR component 60. Respective three-input AND circuits 62 and 64 and a two-input AND circuit 66 have their outputs connected to a three-input OR component 68. My halver includes another two-input AND component 70. I apply the bits from the bank 14 to the halver as the register 10 is stepped and also apply the least significant bit from bank 16 to the halver. This last-named bit enables the halver to determine whether the digit preceding the digit being halved is odd or even. It will be appreciated that at the end of each cycle where the most significant digit of the binary coded decimal number is being worked on, there is no digit which can be considered to be the next preceding higher order digit. In order for my halver to function properly, it is necessary that it be considered that the digit preceding the most significant always be even. To accomplish this on the occurrence of the last shift pulse of a cycle the oddness of what appears to be the next preceding digit is ignored, and the shift pulse is employed to represent a preceding digit which is even. This shift pulse is identified as $P_5$ and its complement as $P_5'$. It will be appreciated that this pulse $P_5$ is an alternate to the bit $Y_5$ when the most significant digit is being halved. I connect the output of an OR circuit 72 to a conductor 74 connected to one input terminal of each of the respective AND circuits 48, 54, 56, 62, 64 and 70. I connect the output of a second OR circuit 76 to a conductor 78 which is connected to one input terminal of each of the AND circuits 50, 58 and 66. I apply the bits from the bank 14 and certain of their complements to the input terminals of the AND circuits of my halver. Adjacent the circuit component input terminals in FIGURE 2, I have designated the manner in which the bits are fed to the halver to operate the halver in accordance with Table III. Respective two-input AND circuits 73 and 75 have their output terminals connected respectively to an input terminal of OR circuit 72 and to an input terminal of OR circuit 76. I apply the first four shift pulses $P_1$ to $P_4$ to one input terminal of each of the AND circuits 73 and 75. I apply the least significant bit $Y_5$ and its complement $Y'_5$ respectively to the other input terminals of circuits 73 and 75. It will be seen that for the first four shift pulses $P_1$ to $P_4$, if either $Y_5$ or its complement $Y'_5$ represents a "1," then the associated circuit 73 or 75 and the circuit 72 or 76 represents a "1" in its output. In order to prevent what apparently is the next preceding digit from taking effect during the last shift pulse, I apply the complement $P'_5$ of this pulse and the pulse $P_5$ respectively to the other input terminal of circuit 72 and to the other input terminal of circuit 76. This ensures that the last, or most significant digit being shifted into the halver is considered to be preceded by an even digit.

The operation of my halver will readily be apparent by considering a simple example. Let us assume that the Y register carries the decimal number 09600. With this number on the register the bits in bank 20 will be 1001 and the bits in bank 18 will be 0110. All the other bits in the register are 0. As the Y register shifts once, all the inputs from bank 14 to the halver are "0." By reference to FIGURE 2, it can be seen that with such inputs all the OR circuits 52, 60 and 68 and AND circuit 70 represent "0's" in their outputs. On the next shift the bits put into the terminals labeled as $Y_2$ and $Y_3$ in FIGURE 2 both are "1's" and the $Y_5$ terminal input is a "1." With this input it will be seen that the three least significant bits $H_3$, $H_2$ and $H_1$ of the halver are "0's." The complement $H_3'$ of $H_3$ is a "1," and since $Y_5$ is a "1," the AND circuit 70 represents a "1" in its output with the result that conductor 40 applies a "1" to the most significant flip flop of bank 22 so that at this point the Y register carries the binary coded representation of 80009. On the next shift of the register a 9 is fed in from the bank 14, and the least significant bit of the next higher digit which is a "0" is fed into the halver. Under these conditions the logic circuit shown in FIGURE 2 represents a 4 in its output and the Y register carries 48000. On the last shift a "0" again is fed into the halver from the bank 14. The last pulse $P_5$ and its complement $P_5'$ are fed into the OR circuits 72 and 76 to ensure that the halver ignores any oddness of what appears to be the next preceding digit. After this operation, the halver carries 04800 or exactly half the number originally placed on the Y register 10.

Referring again to FIGURE 1, my apparatus for multiplying a binary fraction times a binary coded decimal number includes an accumulator register, indicated generally by the reference character 80, having a plurality of respective banks, indicated generally by the reference characters 82, 84, 86, and 90, each of which banks includes four flip-flop circuits 92. The accumulator register 80 is adapted to be shifted by pulses on the channel 24 in the same manner as the Y register 10. Respective channels 94, 96, 98, 100, and 102 apply the shift pulses to the respective banks of the accumulator register 80. This accumulator register is provided to store the results of the operations performed in accordance with Equation 4 in binary coded decimal form. As will be apparent from Equation 4, each time the bit next to the binary point or most significant bit in the representation of the binary fraction X is a "1," this X bit is to be multiplied by the halved representation from the Y register. Respective channels 104, 106, 108 and 110 conduct the outputs from the Y register 10 to an adder 112. Adders of the nature of the adder 112 are well known in the art. One form of binary-coded-decimal adder suitable for use in my apparatus is shown and described on pages 242 and 243 of "Automatic Digital Computers" by Wilkes, published by John Wiley & Sons, Inc., New York (1956). Respective channels 114, 116, 118 and 120 conduct the added output to a gating circuit, indicated generally by the reference character 122, made up of a plurality of flip-flop circuits 124. My apparatus includes a binary number or X input register, indicated generally by the reference character 126, made up of a number of circuits adapted to receive and store the bits of the binary number. The details of registers 80 and 126 may readily be determined from the description given in the Richards publication referred to hereinabove. A channel 128 is adapted to conduct the most significant bit in the X register to the gating circuits 122 to render these circuits conductive if the most significant bit in the X register is a "1." Respective channels 130, 132, 134 and 136 connect the output terminals of the gating circuits 122 to the input terminals of the bank 90 of accumulator register 80. It will be seen that if the most significant bit in the binary register 126 is a "1," the output of the Y register passes through the adder 112 and through the gating circuits 122 to the accumulator register 80. Respective channels 138, 140, 142 and 144 connect the output terminals of accumulator register 80 to channels 146, 148, 150 and 152 leading to a second set of input terminals of adder 112 and to the input terminals of the gating circuits 154 of a second bank, indicated generally by the reference character 156, of gating circuits, the output terminals of which are connected to the respective channels 130, 132, 134 and 136. A channel 158 conducts the complement of the most significant bit in the X register to the bank 156 of gating circuits to render these circuits 154 conductive when the most significant bit in the X register is a "0." It will be seen that if the most significant bit in the X register is a "0," the output from the Y register is not added to the accumulator output, but the accumulator output passes through the conducting gating circuits 154. When the most significant bit in the X register is a "1" gating circuits 122 are open to permit output of the adder to pass into the accumulator register.

I provide my system with a counter 160 adapted to cycle in five counts. The first four pulses produced by counter 160 are conducted by a channel 162 to an OR circuit 164 which passes the pulses to the shift pulse channel 24. The fifth shift pulse produced by counter 160 must perform a number of operations. First it must shift the accumulator register and the Y register in the same manner as the first four pulses. This fifth shift pulse is conducted by a channel 166 to a channel 168 which leads to the OR circuit 164 to pass this pulse to the shift pulse channel 24. In addition to shifting the accumulator and Y registers the fifth pulse must shift the X register 126. Channel 168 also applies this shift pulse to register 126 to cause the register to shift to the left as viewed in FIGURE 1. As has been explained hereinabove, in order that it operate properly the halver 36 must ignore any oddness in the digit which apparently precedes the most significant digit in the binary coded decimal number Y. To ensure this result I pass the fifth counted pulse $P_5$ and its complement $P'_5$ to the halver 36 through conductors 170 and 171.

The operation of my apparatus in performing the multiplication of a binary fraction times a binary coded decimal number can best be understood by considering a specific example with reference to FIGURE 1. Let us again assume that the binary fraction $9/16=.1001000000$ is to be multiplied times the binary coded decimal number $Y=192$. From Equation 4 it will be apparent that in the initial setup the Y register must be set to half the number 192 or 09600. The X register is set to the binary fraction. With this initial setup the operation of the apparatus of FIGURE 1 in the course of the first five cycles of five shift pulses each can readily be seen from Table IV.

*Table IV*

| Shift Pulse | Operation | Register A | Register Y | Register X |
|---|---|---|---|---|
| Initial | | 00000 | 09600 | 10010000 |
| 1 | | 00000 | 00960 | 1001000000 |
| 2 | | 00000 | 00096 | 1001000000 |
| 3 | Cycle 1—Add Y to A—high order $x$ bit a "1". | 60000 | 80009 | 1001000000 |
| 4 | | 96000 | 48000 | 1001000000 |
| 5 | | 09600 | 04800 | 0010000000 |
| 6 | | 00960 | 00480 | 0010000000 |
| 7 | | 00096 | 00048 | 0010000000 |
| 8 | Cycle 2—recirculate A—high order $x$ bit a "0". | 60009 | 40004 | 0010000000 |
| 9 | | 96000 | 24000 | 0010000000 |
| 10 | | 09600 | 02400 | 0100000000 |
| 11 | | 00960 | 00240 | 0100000000 |
| 12 | | 00096 | 00024 | 0100000000 |
| 13 | Cycle 3—recirculate A | 60009 | 20002 | 0100000000 |
| 14 | | 96000 | 12000 | 0100000000 |
| 15 | | 09600 | 01200 | 1000000000 |
| 16 | | 00960 | 00120 | 1000000000 |
| 17 | | 00096 | 00012 | 1000000000 |
| 18 | Cycle 4—Add Y to A | 80009 | 60001 | 1000000000 |
| 19 | | 08000 | 06000 | 1000000000 |
| 20 | | 10800 | 00600 | 0000000000 |

From the table it will be apparent that at the end of four cycles the accumulator register carries the binary coded decimal representation of 10800 which is the desired product $9/16\times192=108$. In the course of the remaining six cycles the Y register number continues to be halved but since the binary fraction is "0" in all these places, the accumulator register merely recycles.

I provide means for determining when the operation has been carried through all the places of the binary number. I accomplish this in a very simple manner. I add a position in which a bit may be stored at the low order end of the binary shift register X and set this bit position to the "1" condition when the other ten bits are loaded with input data. As will be apparent from the discussion hereinabove on each shift cycle a "0" is introduced at the low end of the register and is shifted up the register as the data is shifted. When the configuration 1000000000 is arrived at, the operation is complete.

Figure 3:
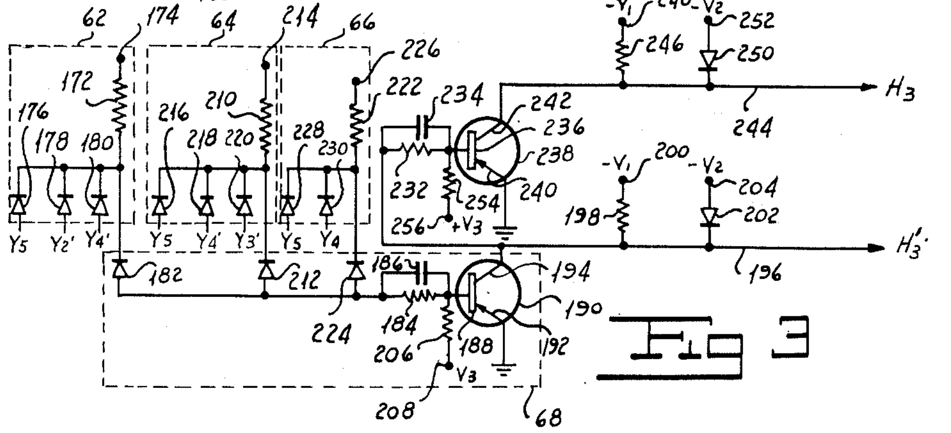
FIGURE 3 is a schematic view showing the details of certain of the logic circuit components of the halver shown in FIGURE 2.

Referring now to FIGURE 3, I have by way of example shown the details of certain of the logic circuit components of FIGURE 2. The AND circuit 62 may, for example, include a resistor 172 connected to the terminal 174 of a suitable source of a negative biasing potential. In this particular form of my circuit negative-going pulses are considered to represent a "1" in the binary system, and ground potential is considered to represent a "0." I connect respective crystal diodes 176, 178 and 180 to the terminal of resistor 172 remote from the terminal 174.

I connect a crystal diode 182 and a resistor 184, shunted by a capacitor 186, in series between resistor 172 and the base 188 of a transistor 190 forming a part of the three-input OR circuit 68. Transistor 190 includes an emitter 192 connected to ground and a collector 194 connected to an output conductor 196. I connect a resistor 198 between the terminal 200 of a source of negative potential $V_1$ and conductor 196. A crystal diode 202 connects the terminal 204 of a source of negative potential $V_2$ to conductor 196. The respective magnitudes of the potentials $V_1$ and $V_2$ at terminals 200 and 204 are such that conductor 196 normally carries a negative potential representing a "1" in the binary system. The transistor 190 is of the p-n-p type, the base of which must be made negative with respect to the emitter 192 in order for the transistor to conduct. I connect a resistor 206 between the base 188 and the terminal 208 of a suitable source of positive potential $V_3$. With these connections the transistor 190 is normally nonconducting with the result that the negative potential on conductor 196 represents a "1" in the binary system. I connect a resistor 210 and a crystal diode 212 in series between the terminal 214 of a source of negative biasing potential and the common terminal of diode 182 and resistor 184. I connect respective crystal diodes 216, 218 and 220 to the common terminal of resistor 210 and diode 212. I connect a resistor 222 and a diode 224 in series between the terminal 226 of a suitable source of negative potential and the common terminal of diode 182 and resistor 184. I connect a pair of crystal diodes 228 and 230 to the common terminal of resistor 222 and diode 224. It will be seen that in order for the transistor 190 to conduct, the lower terminal of one of the resistors 172, 210, and 222 must be at a negative potential to make base 188 negative with respect to emitter 192. In order for this to occur, negative-going pulses representing "1's" must be applied to all the crystal diodes associated with the resistor. In other words, the diodes 176, 178, and 180 form a three-input AND circuit 62, the diodes 216, 218, and 220 form a three-input AND circuit 64 and the diodes 228 and 230 form a two-input AND circuit 66. If any of the resistors 172, 210, and 222 are brought to a negative potential by negative-going pulses applied to all the associated input crystals, the base 188 will be negative with respect to the emitter 192, and transistor 190 will conduct to bring the normally negative conductor 196 to ground to represent a "0" in the binary system. In other words, the transistor 190 and its associated circuitry form a three-input OR circuit 68.

I have so arranged the circuit of FIGURE 3 that conductor 196 carries the complement of the required binary bit output. I connect a resistor 232, shunted by a capacitor 234, between the base 236 of a transistor 238 and the collector 194. Transistor 238 includes an emitter 240 connected to ground and a collector 242 connected to an output conductor 244. A resistor 246 connects conductor 244 to the terminal 248 of a source of negative biasing potential $V_1$. A crystal diode 250 connects conductor 244 to the terminal 252 of a source of negative biasing potential $V_2$. The relative magnitude of the sources having terminals 248 and 252 is such that conductor 244 normally carries a negative potential representing a "1" in the binary system. I connect a resistor 254 between the base 236 and a terminal 256 of a source of positive potential $V_3$. With the transistor 190 not conducting, the negative potential on conductor 196 causes the base 236 to be at a potential below that of emitter 240 with the result that transistor 238 brings to ground the normally negative conductor 244. With the transistor 190 conducting, the negative potential on conductor 196 is grounded to cut off transistor 238 under the action of the potential at terminal 256. It will be seen that transistor 190 is nonconductive when transistor 238 conducts, and transistor 238 is nonconductive when transistor 190 conducts. Conductor 244 carries the desired binary bit $H_3$, while conductor 196 carries the complement $H^{3'}$ of this bit. The other logic components of the halver shown in FIGURE 2 are similar in details to those described in connection with FIGURE 3.

By using certain components of the apparatus of FIGURE 1, I am able to convert a binary fraction to the binary coded decimal equivalent of the fraction. Referring to FIGURE 4, the apparatus for performing this operation includes my Y register 10, the output of which I feed to the halver 36. As was the case in FIGURE 1, the channels 40, 42, 44, and 46 feed the halver output back to the Y register. The conductor 38 applies the least significant bit of the bank 16 containing the next to low order digit of the Y register to the halver. In this case, however, rather than relying upon the last shift pulse of a cycle to ensure that the oddness of what is apparently the digit preceding the most significant digit of the Y register is ignored, I apply the least significant bit or bit furthest from the binary point in the X register to the halver 36 through a gating circuit 257 in a channel 258. Also in this arrangement I cycle the X register 126 in a direction from the most significant toward the least significant bit. From Equation 3 above it can be seen that the binary fraction X may be factored as follows:

$$(5)\quad X=[X_1+\ldots\{+X_7+\{X_8+[X_9+(X_{10})/2]/2\}/2\}/2\ldots]/2$$

The arrangement of FIGURE 4 performs the operations indicated by Equation 5 to convert a binary fraction into its decimal equivalent. Again the operation of the apparatus of FIGURE 4 can best understood by considering a specific example. Let us assume that it is desired to convert the binary fraction 9/16 equal to 1001000000 to its decimal equivalent .5625. For the simple example to be considered, in which the decimal equivalent of the fraction includes only four places, the Y register bank 22 of flip flops may be eliminated. Output channel 166 of counter 160 in this case is arranged to carry every fourth shift pulse and its complement. The fourth shift pulse shifts the Y register banks in the same manner as the first three shift pulses through OR component 164. This fourth pulse shifts the X register through channel 168 and at the same time actuates gating circuit 257 in channel 258 to permit the bit and complement shifting into the low order flip flop of the X register to pass to the halver to permit the halver to ignore the oddness of what is apparently the digit preceding the most significant digit in the Y register. To accomplish this, I set the binary fraction on the X register and cycle the X register through the binary fraction from the least significant to the most significant bit. It will readily be apparent that for the first six cycles the Y registre will contain all "0's," since it initially contained "0" and it was always preceded by an even number "0" represented by the bits in the X register. At the end of six cycles the X register will contain 0000001001, and the Y register contains 0000. In the last four cycles of the sequence the registers will operate in accordance with Table V below.

*Table V*

| Shift Pulse | Y Register | X Register |
|---|---|---|
| 0 | 0000 | 0000001001 |
| 1 | 0000 | 0000001001 |
| 2 | 0000 | 0000001001 |
| 3 | 0000 | 0000001001 |
| 4 | 5000 | 0000000100 |
| 5 | 0500 | 0000000100 |
| 6 | 0050 | 0000000100 |
| 7 | 5005 | 0000000100 |
| 8 | 2500 | 0000000010 |
| 9 | 0250 | 0000000010 |
| 10 | 5025 | 0000000010 |
| 11 | 2502 | 0000000010 |
| 12 | 1250 | 0000000001 |
| 13 | 5125 | 0000000001 |
| 14 | 7512 | 0000000001 |
| 15 | 6251 | 0000000001 |
| 16 | 5625 | 0000000000 |

It will be seen from Table V that in converting from a binary fraction to a binary coded decimal equivalent the apparatus of FIGURE 4 considers the least significant bit of the X register to precede the most significant digit of the Y register to achieve its result.

As has been explained hereinabove, in order to convert a decimal integer to its binary representation, the number is successively halved and each time the integral portion of this operation is an odd number, a "1" is placed to the left of the binary point from the least significant to the most significant place. The apparatus shown in FIGURE 9 is adapted to perform this operation. In order to convert a decimal integer to its equivalent in the binary system the binary coded decimal representation of the integer is entered into the Y register and the X and Y registers are cycled in the manner described hereinabove. Again, since the example to be considered is a simple one, the Y register need only include banks 14, 16, 18, and 20. In this case output channel 166 of counter 160 carries every fourth pulse including the first; that is, pulses 1, 5, 9, and so forth. Each of these pulses shifts the Y register in the usual manner through component 164. At the same time each of these pulses shifts the X register in the direction of the arrow in FIGURE 9 and actuates a gating circuit 259 connected between the least significant flip flop of bank 14 and the high order flip flop of the X register. Thus, each time, starting with the initial setup, that the number represented on the Y register is odd, a "1" is placed in the X register. As the X register is shifted any "1's" put on the register move down the register toward the place of least significance. Let us consider, for example, that it is desired to obtain the binary representation of the decimal number 0025. With this number entered on the Y register the apparatus of FIGURE 9 operates in accordance with Table 6 below to produce the binary representation of this number. In this table I have shown the condition of the registers for only the shift pulses 1 to 20. It will be appreciated that the remaining conditions may readily be determined in accordance with the logic of the apparatus shown in FIGURE 9, since the Y register will continue cycling through "0," always representing an even number. This follows from the fact that by the seventeenth shift pulse I have arrived at the exact representation of the number 25.

*Table VI*

| Shift Pulse | Y Register | X Register |
|---|---|---|
| | 0025 odd | 0000000000 |
| 1 | 2002 | 1000000000 |
| 2 | 1200 | 1000000000 |
| 3 | 0120 | 1000000000 |
| 4 | 0012 even | 1000000000 |
| 5 | 6000 | 0100000000 |
| 6 | 0600 | 0100000000 |
| 7 | 0060 | 0100000000 |
| 8 | 0006 even | 0100000000 |
| 9 | 3000 | 0010000000 |
| 10 | 0300 | 0010000000 |
| 11 | 0030 | 0010000000 |
| 12 | 0003 odd | 0010000000 |
| 13 | 1000 | 1001000000 |
| 14 | 0100 | 1001000000 |
| 15 | 0010 | 1001000000 |
| 16 | 0001 odd | 1001000000 |
| 17 | 0000 | 1100100000 |
| 18 | 0000 | 1100100000 |
| 19 | 0000 | 1100100000 |
| 20 | 0000 even | 1100100000 |

My invention contemplates not only the multiplication of a binary fraction by a binary coded decimal number but also the multiplication of a binary integer by a binary coded decimal number. It will be apparent from Equation 2 that the product of a binary number and a binary coded decimal number can be represented as:

$$(6)\quad P=XY=X_0Y+2X_1Y+(2)^2X_2Y+(2)^3X_3Y+\ldots+2^nX_nY$$

Figures 5, 6:
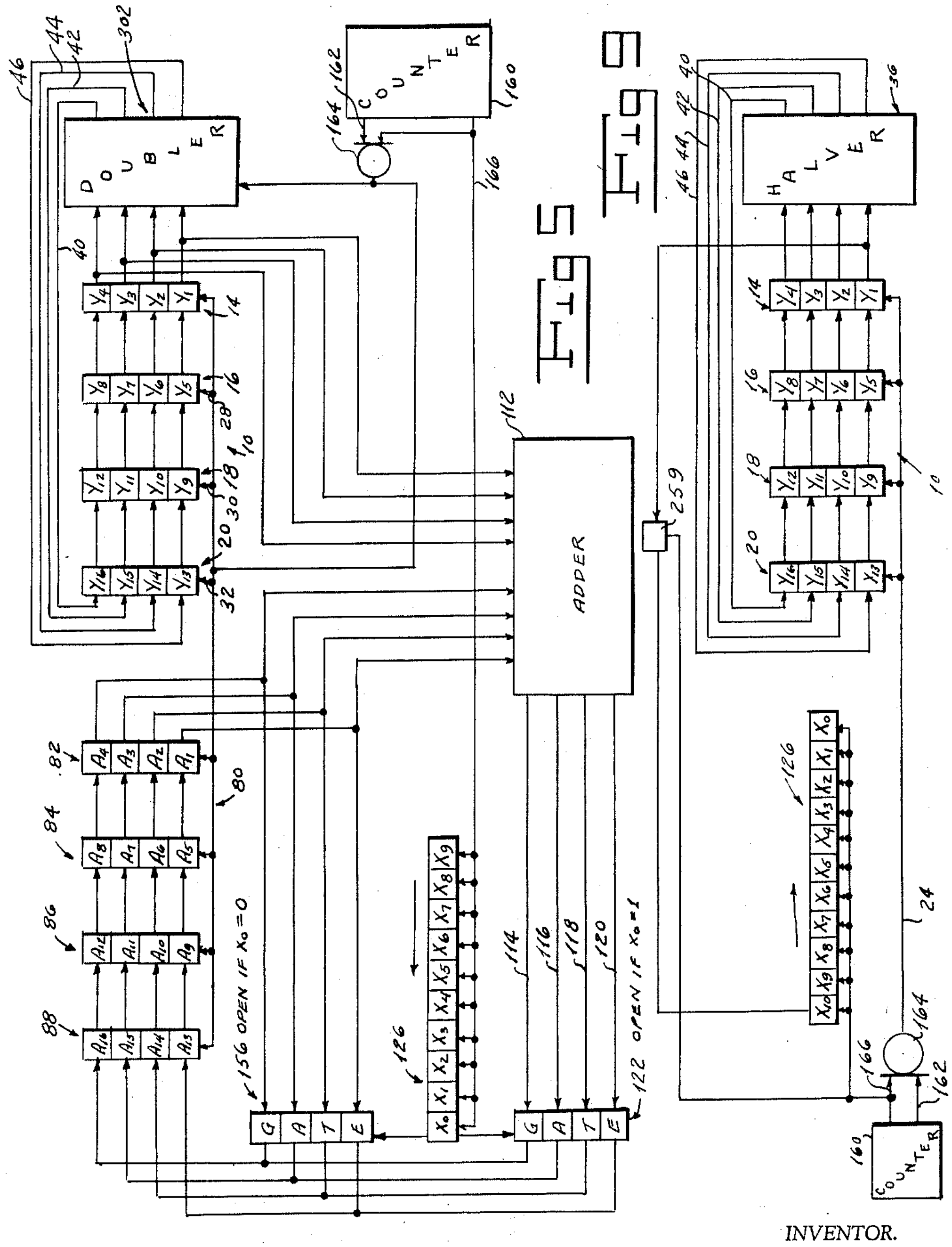
FIGURE 5 is a schematic view of a form of my apparatus for multiplying a binary integer by a binary coded decimal number.
FIGURE 6 is a schematic view of my novel doubler forming part of the system shown in FIGURE 5.
Figure 6:
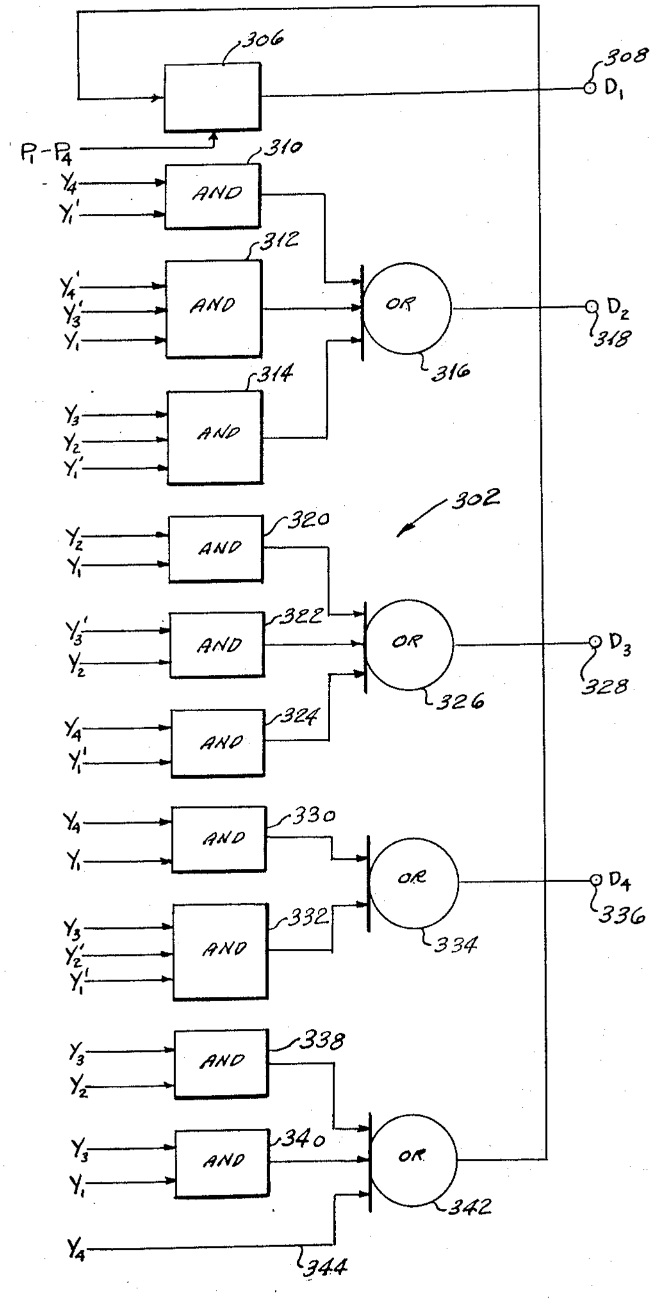

In order to perform this operation it is necessary successively to double the binary coded decimal number and to multiply the doubled values by the respective bits of the binary number. Referring now to FIGURE 5, my apparatus for multiplying a binary integer by a binary coded decimal number includes the Y register 10, the accumulator register 80, the adder 112, the X register 126 and the gating circuits 122 and 156. In this apparatus, however, I replace the halver 36 by a doubler indicated generally by the reference character 302. It can readily be demonstrated that a decimal number may be doubled by taking the respective digits and doubling the digit if the next least significant digit is less than 5 and by doubling the digit and ading 1 if the next least significant digit is greater than 5. It will be appreciated that for the system shown in FIGURE 5 to function properly the serial adder 112 must receive corresponding digits from the accumulators 10 and 80 in the course of its operation. For this to occur both the accumulator register and the Y register must shift in a direction from most to least significant digit and the doubler 302 must operate on the least significant digit first. For proper operation it is necessary that the system "remember" whether the digit just doubled was equal to or greater than five. This is accomplished in a manner to be described to cause doubler 302 to produce outputs in accordance with Table VII below.

*Table VII*

| Current Input Digit | | Output Digit | | | |
|---|---|---|---|---|---|
| | | Last Digit <5 | | Last Digit≧5 | |
| Decimal | Binary | Decimal | Binary | Decimal | Binary |
| 0 | 0000 | 0 | 0000 | 1 | 0001 |
| 1 | 0001 | 2 | 0010 | 3 | 0011 |
| 2 | 0010 | 4 | 0100 | 5 | 0101 |
| 3 | 0011 | 6 | 0110 | 7 | 0111 |
| 4 | 0100 | 8 | 1000 | 9 | 1001 |
| 5 | 0101 | 0 | 0000 | 1 | 0001 |
| 6 | 0110 | 2 | 0010 | 3 | 0011 |
| 7 | 0111 | 4 | 0100 | 5 | 0101 |
| 8 | 1000 | 6 | 0110 | 7 | 0111 |
| 9 | 1001 | 8 | 1000 | 9 | 1001 |

As will be apparent from Equation 6 in the operation of multiplying a binary integer by a binary coded decimal the X register must be shifted in the direction from the most significant toward the least significant digit.

Referring now to FIGURE 6, the logic circuitry making up the doubler 302 includes a storage register 306 the output terminal of which is connected to the doubler output terminal 308 corresponding to the least significant bit of the doubled digit representation. A two-input AND circuit 310 and respective three-input AND circuits 312 and 314 have their output terminals connected to the input terminals of a three-input OR circuit which supplies the next-to-least significant bit of the doubled digit representation to a terminal 318. Respective two-input AND components 320, 322 and 324 have their output terminals connected to a three-input OR circuit 326 which supplies the next-to-most significant bit of the doubled digit representation to a terminal 328. A two-input AND circuit 330 and a three-input AND circuit 334 have their respective output terminals connected to the input terminals of a two-input OR circuit which supplies the most significant bit of the doubled digit representation to a terminal 336.

The storage portion of the doubler 302 which "remembers" whether or not the last digit which was doubled was equal to or greater than five includes respective two-input AND circuits 338 and 340 having output terminals connected to two input terminals of a three-input OR circuit the other input terminal of which is fed by a conductor 344. I connect the output terminal of component 342 to the input terminal of the storage register 306. I trigger the storage register by means of counter pulses $P_1$ to $P_4$ to permit the bit stored in this register to pass to terminal 308. I apply the bits and complements from the bank 14 of the register 10 to the input terminals of the components of doubler 302 in the manner outlined alongside these input terminals in FIGURE 6. With these inputs the component 342 causes a "1" to be placed on the register 306 so that the doubler "remembers" that the preceding digit was equal to or greater than five in the course of the next operation. When the next digit is fed in, it is doubled and the stepping pulse permits the bit contained in the register 306 to pass to the output terminal to produce the proper doubled representation. In this manner the doubler 302 produces outputs in accordance with Table VII above. It is to be noted that if the system is to operate properly with no carry-overs out of the register 10, the digit contained in the most significant bank 20 of the register always will be less than five so that it is not necessary to disable the storage register 306 when the last or most significant digit is being fed in to ensure correct operation. If larger numbers are involved, additional banks may be provided in the register 10.

While I have replaced the halver 36 of FIGURE 1 by a doubler 302 in FIGURE 5 of the remaining connections of the apparatus are the same. As has been explained hereinabove, the apparatus of FIGURE 5 is arranged to multiply a decimal integer times a binary coded decimal number. This product $P=XY$ may be written as:

$$(7)\quad P=2^nXY_n+2^{n-1}YX_{n-1}+2^{n-2}YX_{n-2} + \ldots +2YX_1+YX_0$$

It will be seen that to accomplish the desired operation I take the representation of Y and successively double it and multiply the doubled representations by the bits of the binary number in accordance with Equation 7. As was the case with the circuit of FIGURE 1 the operation of the arrangement shown in FIGURE 5 can best be seen by considering a particular example. Let us take, for example, the binary integer 0000011001=25. Assume we wish to multiply this binary integer by the binary coded decimal number 0150. To accomplish this, I set the binary number on the X register with the bits running from least to most significant, from left to right as viewed in FIGURE 5. I set the binary coded representation of 0150 on the Y register and step the X and Y registers in the direction of the arrows shown below these registers in FIGURE 5. It will be appreciated that upon each cycle the representation in the Y register is doubled and if the least significant bit in the X register is a 1, the doubled representation passes through gating circuit 122 to the accumulator register 80. Table VIII belows shows the condition of the registers in the course of this operation with bank 22 eliminated for simplicity.

*Table VIII*

| Shift Pulse | Operation | Register | | |
|---|---|---|---|---|
| | | A | Y | X |
| Initial | | 0000 | 0150 | 1001100000 |
| 1 | Add Y to A | 0000 | 0015 | 1001100000 |
| 2 | | 5000 | 0001 | 1001100000 |
| 3 | | 1500 | 3000 | 1001100000 |
| 4 | | 0150 | 0300 | 0011000000 |
| 5 | Cycle A | 0015 | 0030 | 0011000000 |
| 6 | | 5001 | 0003 | 0011000000 |
| 7 | | 1500 | 6000 | 0011000000 |
| 8 | | 0150 | 0600 | 0110000000 |
| 9 | Cycle A | 0015 | 0060 | 0110000000 |
| 10 | | 5001 | 0006 | 0110000000 |
| 11 | | 1500 | 2000 | 0110000000 |
| 12 | | 0150 | 1200 | 1100000000 |
| 13 | Add Y to A | 0015 | 0120 | 1100000000 |
| 14 | | 5001 | 0012 | 1100000000 |
| 15 | | 3500 | 4001 | 1100000000 |
| 16 | | 1350 | 2400 | 1000000000 |
| 17 | Add Y to A | 0135 | 0240 | 1000000000 |
| 18 | | 5013 | 0024 | 1000000000 |
| 19 | | 7501 | 8002 | 1000000000 |
| 20 | | 3750 | 4800 | 0000000000 |

From Table VIII it will readily be apparent that after twenty shift pulses the operation is complete and the accumulator register carries the desired product of $$25\times150=3750$$

The logic circuit components of the doubler shown in FIGURE 6 may be made up in a manner similar to that in which the components of the halver circuit of FIGURE 2 are formed, as has been explained hereinabove in connection with FIGURE 3.

Referring now to FIGURE 7, I have provided an alternate form of my doubler which operates starting with the most significant digit of the number to be doubled. As will be explained in detail hereinafter, this doubler, indicated generally by the reference character 260 is employed in converting numbers from one system to another. The logic circuitry making up the doubler 260 includes a two-input AND circuit 269 and respective three-input AND circuits 270 and 272, the output terminals of which are connected to the input terminals of a three-input OR component 274, which produces the least significant bit of the doubled digit representation. A two-input AND circuit 280 and the respetcive three-input AND circuits 282 and 284 have their output terminals connected to an OR circuit 286, the output of which is the next-to-least significant bit of the doubled digit representation. Respective two-input AND circuits 288, 290, and 292 have their output terminals connected to the input terminals of a three-input OR circuit 294 providing the next-to-most significant bit of the doubled representation. A two-input AND circuit 296 and a three-input AND circuit 298 have their output terminals connected to the input terminals of a two-input OR circuit 300 providing the most significant bit of the doubled representation.

From Table VII it will be apparent that where the next succeeding digit is less than five, an even number is represented by the doubler output. Where the next succeeding digit is equal to or greater than five, the doubler represents an odd number in its output. If the doubler is used simply to double a number on the Y register, for example, in order to ensure a proper result when the least significant digit of the Y register is being fed to the doubler, I feed all shift pulses save the last shift pulse to a conductor 278, shown in FIGURE 7, connected to one terminal of each of the AND circuits 269, 270 and 272 which circuits provide the least significant bit of the doubled number. Thus, for all shift pulses save the last, the least significant bit of the doubled digit is determined by the bits of the next digit being fed to the doubler. On the last shift pulse, however, this digit has no effect and is considered always to be less than five. As a result, the last digit of the doubled number always is even, as is true of any doubled number. It will be seen that in this manner I permit my doubler to ignore what appears to be the succeeding digit when the least significant digit of the Y register is being fed to the doubler. While, for purposes of simplicity, I have shown my doubler 302 as well as my halver 36 as producing no complements, it is to be understood that they may readily be made to produce complements in a manner analogous to the manner in which the specific circuit of FIGURE 3 produces its complement. The operation of the doubler can best be demonstrated by considering a specific example. Let us assume that the Y register contains the number 0250. On the first cycle, since "0" is fed into the doubler and the next digit 2 is less than 5, the doubler produced "0" in its output. An examination of FIGURE 7 shows that with the digital representation of 0, that is, $Y_{16}$, $Y_{15}$, $Y_{14}$, $Y_{13}$=0000 and a 2, that is $Y_{12}$, $Y_{11}$, $Y_{10}$, $Y_{9}$=0010 applied to the terminals as indicated in the figure none of the OR circuits produces an output. On the next cycle, however, with a 2 and a 5 fed into the doubler in the manner outlined both the OR circuits 294 and 274 produce outputs representing a 5 in the output. When the Y register has been completely shifted through the doubler, it carries the representation of 0500.

As is explained hereinabove, certain of the elements of my system may be employed to convert a binary integer to its binary coded decimal equivalent. It will readily be apparent from the expression for a binary integer given by Equation 2 above that the binary integer may be factored as follows:

$$(8)\quad X=\{\ .\ .\ .\ \{[(X_9 2+X_8)2+X_7]2+X_6\}2+\ .\ .\ .\ +X_1\}2+X_0$$

Figure 8:
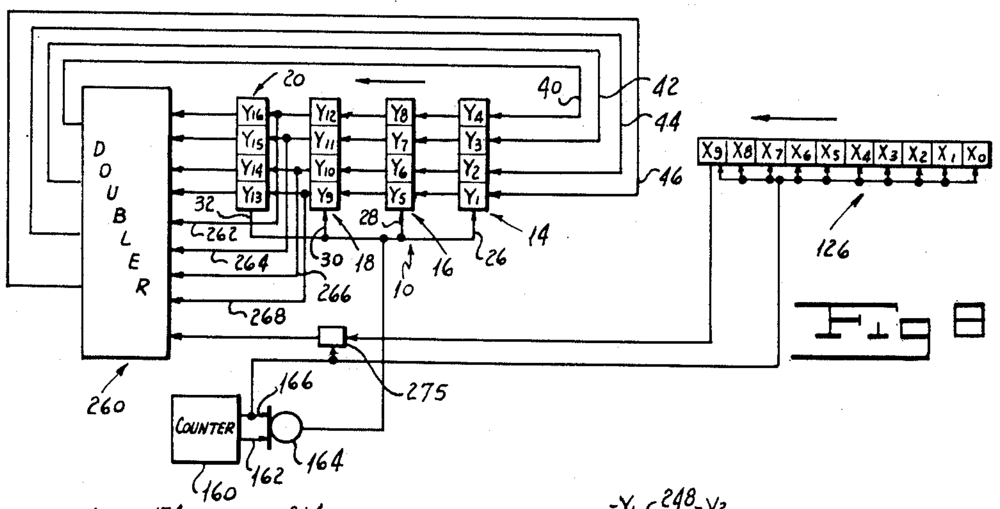
FIGURE 8 is a schematic view of elements of my system arranged to provide conversion from a binary integer to a binary coded decimal integer.

Referring to FIGURE 8, the apparatus for converting from a binary integer to the binary coded decimal equivalent of this integer includes the doubler 260, the Y register 10 arranged to cycle through the doubler in order of digits from most significant to least significant and the X register 126 arranged to be shifted in the direction of the arrow over the X register in FIGURE 8. In operation of the apparatus shown in FIGURE 8 the binary integer is placed on the X register and the Y register is cycled through the doubler. In this case, for the proper operation when the last or low-order bit of the Y register is fed to the doubler, I also feed the high-order bit of the X register to OR circuit 274. I accomplish this by a gating circuit 275 actuated by every fourth shift pulse from counter channel 166. If this bit is a "0," it is considered to be less than 5 and if it is a "1," it is considered to be greater than 5. As was the case with the other apparatus of my invention the operation of the apparatus of FIGURE 8 is best understood by considering a particular example. Let us assume that we wish to obtain the binary coded decimal representation of the binary integer 0000011001=25. With this representation placed on the X register and the X and Y registers stepped or shifted to cycle the Y register representation through the doubler with the low-order bit of the X register considered to follow the low-order digit of the Y register for the first five cycles, the Y register will continually produce "0," since Y initially was "0" and no decimal digit has been followed by a "1" from the X register. At the end of the five cycles the X register will carry 1100100000 and the Y register will carry 0000. For the last five cycles the registers will carry representations in accordance with Table IX below:

*Table IX*

| Shift Pulse | Y Register | X Register |
|---|---|---|
| 1 | 0000 | 1100100000 |
| 2 | 0000 | 1100100000 |
| 3 | 0000 | 1100100000 |
| 4 | 0001 | 1001000000 |
| 5 | 0010 | 1001000000 |
| 6 | 0100 | 1001000000 |
| 7 | 1000 | 1001000000 |
| 8 | 0003 | 0010000000 |
| 9 | 0030 | 0010000000 |
| 10 | 0300 | 0010000000 |
| 11 | 3000 | 0010000000 |
| 12 | 0006 | 0100000000 |
| 13 | 0060 | 0100000000 |
| 14 | 0600 | 0100000000 |
| 15 | 6001 | 0100000000 |
| 16 | 0012 | 1000000000 |
| 17 | 0120 | 1000000000 |
| 18 | 1200 | 1000000000 |
| 19 | 2002 | 1000000000 |
| 20 | 0025 | 0000000000 |

From Table IX it will be apparent at the end of twenty cycles the binary integer in the X register has been converted to the binary coded decimal equivalent in the Y register.

Figure 10:
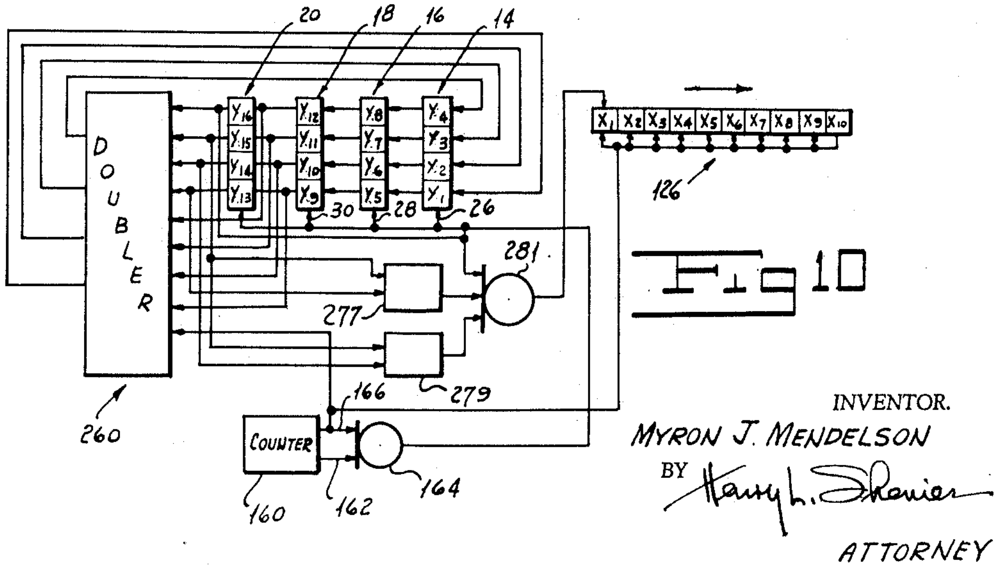
FIGURE 10 is a schematic view of elements of my system arranged to provide conversion from a binary coded decimal fraction to a binary fraction.

The system shown in FIGURE 10 is capable of converting a decimal fraction to a binary fraction. As has been explained hereinabove, if it is desired to obtain the binary equivalent of a decimal fraction, the fraction is successively doubled and each time the result goes into the units place a "1" is placed to the right of the binary point in the binary representation. It will be apparent that the doubling arrangement of FIGURE 10 is capable of performing this operation mechanically. In order to accomplish this result I place the binary coded decimal fraction on the Y register. On each cycle the number in the Y register is doubled with carry-overs in the place to the left of the most significant bank of the Y register being ignored. At the beginning of each cycle the binary or X register is shifted one bit in the direction of the arrow over the register and a "1" or a "0" is entered in the X register as the high-order digit of the Y register is equal to or greater than 5, which would result in a carry-over, or less than 5. To accomplish this I connect the output terminals of the next-to-most significant bit and least significant bit circuits of the bank 20 of the Y register containing the most significant digit to a first two-input AND circuit 277. I connect the output terminals of the next-to-most significant bit and next-to-least significant bit circuits of the most significant bank 20 to a second two-input AND circuit 279. I connect the output terminals of circuits 277 and 279 to two input terminals of a three-input OR circuit 281 and connect the output terminal of the most significant bit circuit of the Y register bank 20 to the last input terminal of the circuit 281 to cause circuit 281 to place a "1" on the X register whenever the most significant digit in the Y register is greater than or equal to five. In this case also the stepping pulse corresponding to the number of places in the Y register is considered to follow the least significant digit of the Y register. With the X and Y registers shifted in the manner described hereinabove, the operation of the arrangement of FIGURE 10 is in accordance with Table X below:

*Table X*

| Shift Pulse | Y Register | X Register |
|---|---|---|
| Initial Condition | 5625≧5 | 0000000000 |
| 1 | 6251 | 0000000001 |
| 2 | 2512 | 0000000001 |
| 3 | 5125 | 0000000001 |
| 4 | 1250<5 | 0000000001 |
| 5 | 2502 | 0000000010 |
| 6 | 5025 | 0000000010 |
| 7 | 0250 | 0000000010 |
| 8 | 2500<5 | 0000000010 |
| 9 | 5005 | 0000000100 |
| 10 | 0050 | 0000000100 |
| 11 | 0500 | 0000000100 |
| 12 | 5000≧5 | 0000000100 |
| 13 | 0000 | 0000001001 |
| 14 | 0000 | 0000001001 |
| 15 | 0000 | 0000001001 |
| 16 | 0000<5 | 0000001001 |

It will be noted that in Table X I have shown only the first sixteen shift pulses. From this point on, the Y register continues to produce only "0's" and the X register shifts to the left until the "1," representing the most significant bit of the binary fraction, arrives at the most significant place in the X register. In this manner any decimal fraction may readily be converted to its binary equivalent.

In operation of the system shown in FIGURE 1 in which it is desired to multiply a binary fraction times a binary coded decimal number the fraction is fed into the X register and half the binary coded decimal number is fed into the Y register. Both the Y register and the accumulator register are cycled in a number of steps and the X register is stepped at the end of each cycle. The Y register is stepped in order of digits from the least significant through the most significant digit through the halver so that the halver successively halves the number in the Y register in the course of successive cycles. The X register is stepped in a direction from the least significant fractional bit toward the most significant fractional bit. If the bit in the most significant place, or next to the binary point, in the X register is a "1," the gating circuit 122 is open to pass the sum of the accumulator register output and the Y register output to the accumulator. If a "0" is in the most significant place in the X register, gating circuits 156 are open so that the accumulator register merely recycles. On the last step of each cycle the fifth pulse from the counter 160 is fed into the halver 36 rather than the least significant bit of the next-to-least significant bank 16. In this manner the arrangement of FIGURE 1 operates to multiply a binary coded decimal number by a binary fraction.

Where it is desired to multiply a binary integer times a binary coded decimal number, I use the system of FIGURE 1 with the exception that the operator which operates on the number in the Y register is a doubler 302 rather than a halver. The operation of this system is similar to that of FIGURE 1 and performs the operations indicated by Equation 7 above. It is to be understood that the Y register in this case is shifted through the doubler in order of digits from the least significant digit to the most as is the case in FIGURE 1. In setting up the Y register in this case the binary coded number is set directly on the register.

As has been explained hereinabove, the apparatus shown in FIGURE 4 may be used to convert a binary fraction to a decimal fraction and that of FIGURE 10 may be used to convert a decimal fraction to a binary fraction. Further, the apparatus shown in FIGURE 8 is capable of converting a binary integer to a decimal integer while the arrangement of FIGURE 9 performs the reverse conversion.

It will be seen that I have accomplished the objects of my invention. I have provided apparatus for performing arithmetic operations with two operands expressed in different base number systems. My apparatus is adapted to multiply either a binary fraction or a binary integer times a binary coded decimal number. My system is capable of converting binary fractions to decimal fractions, binary integers to decimal integers and the reverse of each of these conversions. My system functions rapidly in converting and may be made as a single unit to perform all of the above operations.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for multiplying a multiple digit natural binary coded operand represented by signals indicating a group of bits the significance of which is defined by a binary point by a binary coded decimal operand represented by signals indicating the bits of groups corresponding to the respective digits of the binary-coded-decimal number including in combination a first register for receiving signals representing the bits of the binary operand, a second register for receiving signals representing the bits of the binary coded decimal operand, an accumulator register, means for successively halving one of the operands in a number of cycles, means connecting said halving means to one of said first and second registers, means for doubling the other operand in each of said cycles, means connecting said doubling means to the other of said first and second registers, means responsive to the signal representing the bit next to the binary point in the binary representation of the operand in the first register for gating the output of the second register to the accumulator register and means connecting said output gating means between said second register and said accumulator register.

2. Apparatus for multiplying an integral multiple digit natural binary coded operand represented by signals indicating a group of bits the significance of which is defined by a binary point by a binary coded decimal operand represented by signals indicating the bits of groups corresponding to the respective digits of the binary-coded-decimal number including in combination a first register for receiving signals representing the bits of the binary operand, a second register for receiving signals representing the bits of the binary coded decimal operand, an accumulator register, means for successively halving said binary operand in a number of cycles, means connecting said halving means to one of said first and second registers means for doubling said binary coded decimal operand in each of said cycles, means connecting the doubling means to the other of said first and second registers, means responsive to the signal representing the bit next to the binary point in the binary representation of the binary operand in the first register for passing the output of the second register to the accumulator register and means connecting the output passing means between the second register and the accumulator register.

3. Apparatus as in claim 2 in which said means for successively halving said binary operand includes means for stepwise shifting said binary operand out of said first register in a direction from the most significant bit toward the least significant bit of the operand and in which said means for doubling said binary coded decimal operand includes a doubler and means for shifting said binary coded decimal operand out of said second register and through said doubler and back to said second register in each of said cycles.

4. Apparatus for multiplying a fractional multiple digit natural binary coded operand represented by signals indicating a group of bits the significance of which is defined by a binary point by a binary coded decimal operand represented by signals indicating the bits of respective groups corresponding to the digits of the binary-coded-decimal number including in combination a first register for receiving signals representing the bits of the binary operand, a second register for receiving the binary coded decimal operand, an accumulator register, means for successively halving said binary coded decimal operand in a number of cycles, means connecting said halving means to one of said first and second registers means for doubling said fractional binary operand while ignoring carry-overs into the units place in each of said cycles, means connecting said doubling means to the other of said first and second registers, means responsive to the signal representing the bit next to the binary point in the binary representation of the binary operand in the first register for passing the output of the second register to the accumulator register and means connecting the output passing means between the second register and the accumulator register.

5. Apparatus as in claim 4 in which said means for halving said binary coded decimal operand includes a halver and means for shifting said binary coded decimal operand out of said second register and through said halver and back to said second register in each of said cycles and in which said means for doubling said fractional binary operand comprises means for shifting said fractional binary operand out of said first register in a direction from the least significant bit toward the most significant bit.

6. Apparatus for performing arithmetic operations including in combination a first register for receiving and storing signals representing the bits of a binary coded decimal number represented by signals indicating the bits of respective groups corresponding to the digits of the binary-coded-decimal number, said register being adapted to be shifted successively to pass the digital representations of the number contained therein out of said register, an accumulator register for receiving and storing signals representing the bits of a binary coded decimal number, said accumulator register being adapted to be shifted successively to pass the digital representations of the number contained therein out of said accumulator register, means for simultaneously cycling said first and said accumulator registers in a series of shift steps, an operating means for performing a predetermined arithmetic operation on a number shifted therethrough, means for passing the digital representation shifted out of said first register through said operating means and back to said first register to cause said operating means to perform said predetermined arithmetic operation on the number in said first register in the course of each cycle, an adder, means for applying the outputs of said first register and said accumulator register to said adder to cause the adder to produce an output representing the sum of the numbers in said first register and accumulator register in the course of a cycle, a second register adapted to receive and store signals representing the bits of a multiple digit natural binary coded number represented by signals indicating a group of bits the significance of which is defined by a binary point, means for shifting said second register at the end of each cycle, and means responsive to the signal representing a certain order bit of said second register for applying said adder output to said accumulator register when said certain order bit represents a "1" in the binary code and for applying said accumulator register output to said accumulator register input when said certain order bit represents a "0" in the binary code.

7. Apparatus as in claim 6 in which said operating means is a halver.

8. Apparatus as in claim 6 in which said operating means is a doubler.

9. Apparatus as in claim 6 in which said means responsive to said second register bit comprises a first gating circuit connected between the accumulator register output and the accumulator register input and a second gating circuit connected between the adder output and said accumulator register input, said first gating circuit being responsive to said certain order bit of said second register to pass the accumulator register output to the accumulator register input when said certain order bit is a "0," said second gating circuit being responsive to said certain order bit to apply said adder output to said accumulator input when said certain order bit is a "1".

10. Apparatus for multiplying a binary coded decimal number represented by signals indicating the bits of respective groups corresponding to the digits of the binary-coded-decimal number by a multiple digit natural binary coded fraction represented by signals indicating a group of bits the significance of which is defined by a binary point including in combination a first register for receiving and storing signals representing the bits of a binary coded decimal number, said first register being adapted to be shifted successively to pass the digit representations of the number contained therein out of said register, an accumulator register for receiving and storing signals representating the bits of a binary coded decimal number, said accumulator register being adapted to be shifted successively to pass the digit representations of the number contained therein out of said accumulator register, a halver for halving a binary coded decimal number shifted through said halver, means for cycling said first register through said halver and back to said first register in order of digits from the least significant digit through the most significant in a series of shift steps to cause said halver to halve the number in said first register, means for cycling said accumulator register simultaneously with said first register, an adder, means for applying the digital representations shifted out of said accumulator register and shifted out of said first register to said adder to cause the adder to produce an output representing the sum of the numbers in said first and accumulator registers in the course of a cycle, a second register adapted to receive and store signals representing the bits of said binary fraction representation, means for shifting said second register at the end of each cycle in a direction from the least significant toward the most significant bit, means responsive to the signal representing the bit next to the binary point in said second register for applying said adder output to said accumulator register when the bit next to the binary point in said second register represents a "1" in the binary code and means responsive to the signal representing said bit next to the binary point for applying the accumulator register output to the accumulator register input when said bit next to the binary point represents a "0" in the binary code.

11. Apparatus for multiplying a multiple digit natural binary coded integer represented by signals indicating a group of bits the significance of which is determined by a binary point by a binary coded decimal number represented by signals indicating the bits of respective groups corresponding to the digits of the binary-coded-decimal number including in combination a first register for receiving and storing signals representing the bits of a binary coded decimal number, said first register being adapted to be shifted successively to pass the digit representations of the number contained therein out of said register, a doubler adapted to produce the representation of double a number whose representation is passed through the doubler, means for cycling the first register in a number of steps to pass the digit representations contained therein through said doubler in order of significance from least significant digit through most significant digit in a series of steps and back to said first register to cause said doubler to double the representation on said first register, an accumulator register for receiving and storing signals representing the bits of a binary coded decimal number, said accumulator register being adapted to be shifted successively to pass the digit representations of the number contained therein out of said accumulator register, means for cycling said accumulator register simultaneously with said first register, an adder, means for applying the outputs of said first register and said accumulator register to said adder to cause the adder to produce an output representing the sum of the numbers in said first register and accumulator register in the course of a cycle, a second register adapted to receive and store signals representing the bits of said binary integer, means for shifting said second register at the end of each cycle in a series of steps in a direction from the most significant bit toward the least significant bit, means responsive to the signal representing the bit next to the binary point in said second register for applying said adder output to said accumulator register input when said bit next to the binary point represents a "1" in the binary code and means responsive to the signal representing said bit next to the binary point for passing said accumulator register output back to said accumulator register input when said bit next to the binary point represents a "0" in the binary code.

12. Apparatus for converting a binary fraction to the equivalent binary coded decimal representation of the fraction including in combination a first register for receiving and storing a binary coded decimal number, said first register being adapted to be shifted successively to pass the digit representations of the number contained therein out of said register, a halver for halving a binary coded decimal number the representations of which are passed through said halver, means for cycling said first register successively to pass the digit representations of the number contained therein through said halver and back to said first register to cause said halver to halve the number contained in said register on each cycle, a second register for receiving and storing the bits representing the binary fraction, said second register being adapted to be shifted in a series of steps in a direction from the most significant bit toward the least significant bit, means for stepping said second register at the end of each cycle and means responsive to said second register stepping means for applying the least significant bit of said second register to said halver at the end of each cycle.

13. Apparatus for converting a binary coded decimal integer to its binary equivalent including in combination a first register for receiving and storing the binary coded decimal integer, a halver adapted to halve a binary coded decimal number shifted through the halver, means for cycling said first register in a series of steps successively to pass the digit representations of the integer contained therein through said halver to cause said halver to halve the integer in said first register, a second register for receiving and storing the bits of a binary number, said second register being adapted to be shifted in a direction from the most significant bit toward the least significant bit, said first register cycling means comprising means for stepping said second register on the last step of each cycle and means responsive to said second register stepping means for applying the least significant bit of the lowest order representation in said first register to said second register at the beginning of each cycle.

14. Apparatus for converting a binary integer to its binary coded decimal equivalent including in combination a first register for receiving and storing the digit representations of a binary coded decimal number, said first register being adapted to be shifted in a series of steps in a direction from least significant digit toward the most significant digit, a doubler for doubling any number the digit representations of which are fed through said doubler, means for shifting said first register in a series of steps successively to pass the digit representations contained therein through said doubler and back into said first register, a second register for receiving and storing the bits of said binary integer, said second register being adapted to be shifted in a direction from the least significant bit toward the most significant bit, said means for shifting said first register comprising means for shifting said second register on the last step of each cycle and means responsive to said second register shifting means for applying the most significant bit of said second register to said doubler.

15. Apparatus for converting a binary coded decimal fraction to its binary equivalent including in combination a first register for receiving and storing said binary coded decimal fraction, said first register being adapted to be shifted successively to pass the digit representations of the number contained therein out of said first register, a doubler for doubling any number the digit representations of which are successively passed through said doubler, means for cycling said first register in a series of steps successively to pass the digit representations of the number contained therein through said doubler and back to said first register to cause said doubler to double the number in said first register on successive cycles, a second register for receiving and storing the bits of a binary number, said means for cycling said first register comprising means for shifting said second register on the last step of each cycle and means responsive to the first register output for applying a bit representing a "1" in the binary code to said second register when the digit representation being shifted out of said first register represents a number equal to or greater than "5."

16. In apparatus for performing arithmetic operations a register adapted to receive and store signals providing the digital representations of a binary coded decimal number the respective digits of which are represented by groups of bits indicated by signals,, a halver, means for applying signals representing the bits of the least significant digit representation in said register to said halver, means for feeding the output of said halver back to the input to said register, means for cycling said register in a number of shift steps equal to the number of places represented in said register and means for applying the signal representing least significant bit of the next-to-least significant digit representation in said register to said halver concomitantly with the application of signals representing the bits of the least significant digit representation in the register to the halver.

17. Apparatus as in claim 16 in which said cycling means includes means for applying a pulse to said halver on the last step of a cycle.

18. In apparatus for performing arithmetic operations a register adapted to receive and store the digital representations of a binary coded decimal number, a doubler, means for applying the bits of the most significant digit representation in said register to said doubler, means for feeding the output of said doubler back to the input to said register, means for applying the bits of the next-to-most significant digit representation in said register to said doubler, and means for cycling said register in a number of shift steps equal to the number of places represented in said register.

19. Apparatus as in claim 18 in which said cycling means includes means for applying a pulse to said doubler on the last step of a cycle.

20. In apparatus for performing arithmetic operations a halver for producing a binary coded decimal output representation of half a number represented by signals indicating the bits of groups corresponding to the respective digits of said number contained in a register and adapted to be shifted through the halver and back to said register including means responsive to the signal indicating the next-to-least significant bit and complement of the next-to-least significant bit of the input digit and to the signal indicating the least significant bit and complement of the least significant bit of the next input digit for producing a least significant output bit representing a "1" in the binary code when the next-to-least significant bit of the input digit represents a "0" and the next input digit is odd and when the next-to-least significant bit of the input digit represents a "1" and the next digit is even, means responsive to the signal representing the next-to-least significant bit and complement of the next-to-least significant bit of the input digit and the next-to-most significant bit and complement of the next-to-most significant bit of the input digit and the least significant bit and complement of the least significant bit of the next input digit for producing a next-to-least significant output bit representing a "1" in the binary code when the next-to-least significant bit of the input digit represents a "0" and the next-to-most significant bit represents a "1" and the next input digit is odd and when the next-to-least significant bit of the input digit represents a "1" and the next-to-most significant bit of the input digit represents a "0" and the next input digit is odd and when the next-to-most significant bit represents a "1" and the next input digit is even, means responsive to the complement of the next-to-least significant bit and complement of the next-to-most significant bit and most significant bit and complement of the most significant bit of the input digit and the least significant bit and complement of the least significant bit of the next input digit for producing an output representing a "1" in the next-to-most significant output place when the most significant bit of the input digit represents a "0" and the next-to-least significant bit of the input digit represents a "0" and the next input digit is odd and when the most significant bit represents a "0" and the next-to-most significant bit represents a "0" and the next input digit is odd and when the most significant bit represents a "1" and the next input digit is even and means responsive to the signal indicating the complement of the next-to-most significant bit of the output representation and the least significant bit of the next input digit for producing an output representing a "1" in the most significant output place when the next-to-most significant bit of the output representation represents a "0" and the next digit is odd.

21. In apparatus for performing arithmetic operations a doubler for producing a binary coded decimal output representation of double a number represented by a binary coded decimal input representation made up of groups of binary bits which groups represent the digits of said number and which bits are carried in a register, which bits are adapted to be shifted through the doubler and back to the register including means responsive to the bits of the representation of the digit next most significant in decreasing order of significance to the digit whose representation is being shifted into said doubler for producing a least significant output bit representing a "1" in the binary code when the most significant bit of said next most significant digit represents a "1" in the binary code and when the next-to-most and next-to-least significant bits of said next most significant digit representation both represent "1's" in the binary code and when the next-to-most and least significant bits of said next most significant digit representation both represent "1's" in the binary code, means responsive to the bits and to the complements of the most and the next-to-most and the least significant of the bits of the representation of the digit being shifted into the register for producing a next-to-least significant output bit representing a "1" in the binary code when the most significant bit and the complement of the least significant bit of the representation being shifted both represent "1's" in the binary code and when the next-to-most and next-to-least significant bits and the complement of the least significant bit of the representation being shifted all represent "1's" in the binary code and when the complements of the most and next-to-most significant bits and the least significant bit of the representation being shifted all represent "1's" in the binary code, means responsive to the most and next-to-least and least significant bits and to the complements of the next-to-most and least significant bits of the representation being fed for producing a next-to-least significant output bit when the least and next-to-least significant bits of the representation being fed to the doubler both represent "1's" in the binary code and when the most significant bit and the complement of the least significant bit of the representation being fed both represent "1's" in the binary code and when the complement of the next-to-most significant bit and the next-to-least significant bit both represent "1's" in the binary code and means responsive to the most and next-to-most and least significant bits and to the complement of the next-to-least significant bit for producing a most significant output bit representing a "1" in the binary code when the most significant and least significant bits of the representation being fed both represent "1's" in the binary code and when the next-to-most and least significant bits and the complement of the next-to-least significant bit all represent "1's" in the binary code.

22. In apparatus for performing arithmetic operations a register adapted to receive and store signals indicating the groups of bits of the digital representation of a binary coded decimal number to be doubled, means for cycling said register in a number of shift steps equal to the number of places represented in said register sequentially to shift said signals indicating the groups of bits out of said register, a doubler, and means for applying the signals indicating the groups of bits being shifted out of the register to the doubler, said doubler including means responsive to signals indicating the bits of a digit representation being fed to the doubler on a shift step for storing an indication of a "1" in the binary code in the least significant place of the doubled representation of the digit corresponding to the group of bits to be fed to the register on the next shift step.

23. Apparatus as in claim 22 in which said cycling means includes means for actuating said storage means on each shift step.

References Cited in the file of this patent

UNITED STATES PATENTS

| | | |
|---|---|---|
| 2,192,612 | Long et al. | Mar. 5, 1940 |
| 2,419,502 | Saxby | Apr. 22, 1947 |
| 2,544,126 | Baldwin | Mar. 6, 1951 |
| 2,745,599 | Woods-Hill et al. | May 15, 1956 |
| 2,762,563 | Samson et al. | Sept. 11, 1956 |
| 2,829,827 | Bergfors | Apr. 8, 1958 |
| 2,845,219 | Piel | July 29, 1958 |
| 2,954,927 | Woods-Hill | Oct. 4, 1960 |